US00RE34793E

United States Patent [19]

Peck et al.

[11] E Patent Number: Re. 34,793

[45] Reissued Date of Patent: Nov. 22, 1994

[54] LIFT FOR WATER VEHICLES

[75] Inventors: Ralph E. Peck; Todd A. Elson, both of Claremore, Okla.; Masoud Toofan, Shiraz, Islamic Rep. of Iran

[73] Assignee: Hydrohoist International, Inc., Claremore, Okla.

[21] Appl. No.: 16,067

[22] Filed: Feb. 10, 1993

Related U.S. Patent Documents

Reissue of:

[64] Patent No.: 5,016,551
Issued: May 21, 1991
Appl. No.: 523,484
Filed: May 15, 1990

[51] Int. Cl.[5] ..... B63C 1/02

[52] U.S. Cl. ..... 114/45; 405/3

[58] Field of Search ..... 114/44, 45, 48, 49, 114/52, 53; 405/2, 3

[56] References Cited

U.S. PATENT DOCUMENTS

| | | | |
|---|---|---|---|
| 3,603,276 | 9/1971 | DeLisle | 114/45 |
| 4,072,119 | 2/1978 | Williams | 114/45 |
| 4,482,268 | 11/1984 | Stevenson | 114/44 |
| 4,678,366 | 7/1987 | Williamson | 405/3 |
| 4,900,187 | 2/1990 | Uchida | 114/48 |

*Primary Examiner*—Jesus D. Sotelo
*Attorney, Agent, or Firm*—Catalano, Zingerman & McKay

[57] ABSTRACT

A lift for water vehicles comprising a pair of vertical pipes or tracks attached adjacent their upper ends to one side only of a dock structure which is positioned alongside a body of water, a tank assembly having a roller assembly thereon for engaging the sides of the pipes for rolling upwardly and downwardly thereon, the tank assembly having a tank mounted thereon and an upper opening for introducing air into the tank to displace water therefrom through a lower opening at the bottom of the tank so as to cause the tank to rise, the tank assembly having a pair of spaced padded blocks for supporting a water vehicle thereon, the roller assembly having roller thereon adapted to rise along the inboard sides of the pipes when the tank assembly moves vertically in response the introduction of air to and removal of air from the tank, whereby, when a water vehicle is supported on the padded blocks and the tank assembly is in its lowermost position, air can be introduced into the tank while water is forced outwardly from the opening at the bottom of the tank so that the vehicle can be elevated above the body of water.

12 Claims, 3 Drawing Sheets

LIFT FOR WATER VEHICLES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a lift for water vehicles or water craft. More particularly, this invention pertains to a lift which is slidably attached to one side only of a dock.

2. The Prior Art

Many lifts for water vehicles, or boat dry docking devices or apparatus (as they are sometimes referred to), are available on the market today. However, many of these devices require a rectangular slip in which the lift is received, or these devices are otherwise complicated from the standpoint of requiring numerous parts and components to make the device operative. On the other hand, the present invention merely involves the employment of a single slide which can be attached to one side only of a dock structure.

A preliminary search was conducted on the above invention and the following U.S. Patents were uncovered in the search:

| Inventor | U.S. Pat. No. | Issue Date |
|---|---|---|
| Rogers | 2,151,394 | March 21, 1939 |
| DeLisle | 3,603,276 | September 7, 1971 |
| Rutter | 3,857,248 | December 31, 1974 |
| Carson | 3,951,087 | April 20, 1976 |
| Bradfield | 3,967,570 | July 16, 1976 |
| Williams | 4,072,119 | February 7, 1978 |
| Boujard et al | 4,104,082 | August 1, 1978 |
| Pritchett | 4,641,595 | February 10, 1987 |
| White | 4,808,028 | February 28, 1989 |

None of the above patents are deemed sufficiently close to warrant any comment.

SUMMARY OF THE INVENTION

A lift for water vehicles is provided with a pair of vertical pipes or tracks attached adjacent their upper ends to one side only of a dock structure which is positioned alongside a body of water, such as a lake. The pipes are attached to the dock by means of a pair of spaced bracket assemblies. These bracket assemblies might vary as to their particulars, depending upon the peculiarities of a given dock; for the purpose of this invention these brackets firmly attach to one side of the dock structure and to the upper ends of the pipes. However, it is preferable that these bracket assemblies permit vertical adjustment of the pipes.

The lift also includes a tank assembly a roller assembly thereon for engaging the sides of the pipes for rolling upwardly and downwardly thereon, the tank assembly having a tank mounted thereon and an upper opening for introducing air into the tank to displace water therefrom through a lower opening at the bottom of the tank so as to cause the tank to rise. The tank assembly is provided with a pair of spaced padded blocks for supporting a water vehicle thereon. The roller assembly is provided with rollers thereon adapted to ride along the inboard sides of the pipes when the tank assembly moves vertically in response to the introduction of air to and removal of air from the tank, whereby, when a water vehicle is supported on the padded blocks and the tank assembly is in its lowermost position, air can be introduced into the tank while water is forced outwardly from the opening at the bottom of the tank so that the vehicle can be elevated above the body of water.

The tank assembly also includes a pair of upper curved bands made of flexible metal straps surrounding the upper portion of the tank adjacent the ends thereof. A similar pair of curved bands surround the lower portion of the tank in alignment with the upper bands. The ends of the upper bands are bent outwardly away from the tank to form short horizontal flanges; likewise, the ends of the lower bands are similarly bent to form short horizontal flanges which are spaced below the upper flanges. The upper bands are pulled toward the lower bands by means of bolts which pass through the upper and lower flanges. By tightening nuts which are received on the lower ends of these bolts, the bands will firmly engage the outer circumference of the tank.

An upper frame structure is positioned above the upper bands and a lower frame structure is positioned below the lower bands. A roller arm assembly is provided for each of four rollers. Each roller assembly is attached to the frame structure such that the rollers which are mounted on these roller assemblies are positioned to ride or roll against the inboard sides of the pipes.

For the purpose of supporting a water vehicle or craft on the float apparatus of the present invention, a pair of spaced blocks extend across the top of the frame structure substantially parallel to the dock. These blocks can be made of wood, if desired, and are preferably covered with cloth or carpet-like material to prevent marring or scratching of the boat hull when a water vehicle is brought to rest on these blocks.

Assuming that the float or tank assembly is in its lowermost position, a water craft can be positioned on or over the submerged blocks. An air pump can be turned on and air will be introduced into the tank through a hose and a valve while water is forced out of the opening at the bottom of the tank. The tank will commence to rise while the rollers roll against the sides of the pipes. Continued pumping of air into the tank will cause the water vehicle to be lifted bodily out of the water. When the tank assembly reaches the desired vertical position, the valve is closed to prevent air from escaping from the tank and the air pump is turned off simultaneously. When it is desired to lower the tank assembly, the valve is opened to allow air to pass out of the hose while water passes into the tank through the bottom hole, thereby causing the tank assembly to lower into and beneath the water.

DETAILED DESCRIPTION OF THE PREFERRED EMBODIMENTS

Figure 1:
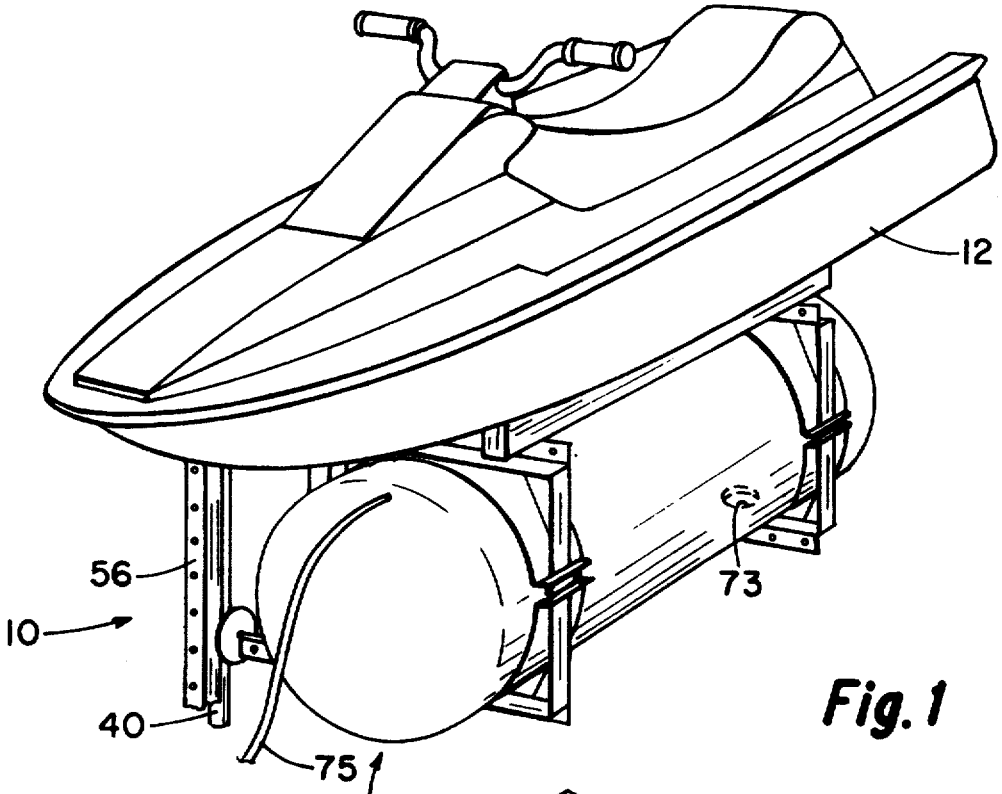
FIG. 1 is a perspective view of the invention with a water craft supported thereon as viewed from the lake side.
Figure 3:
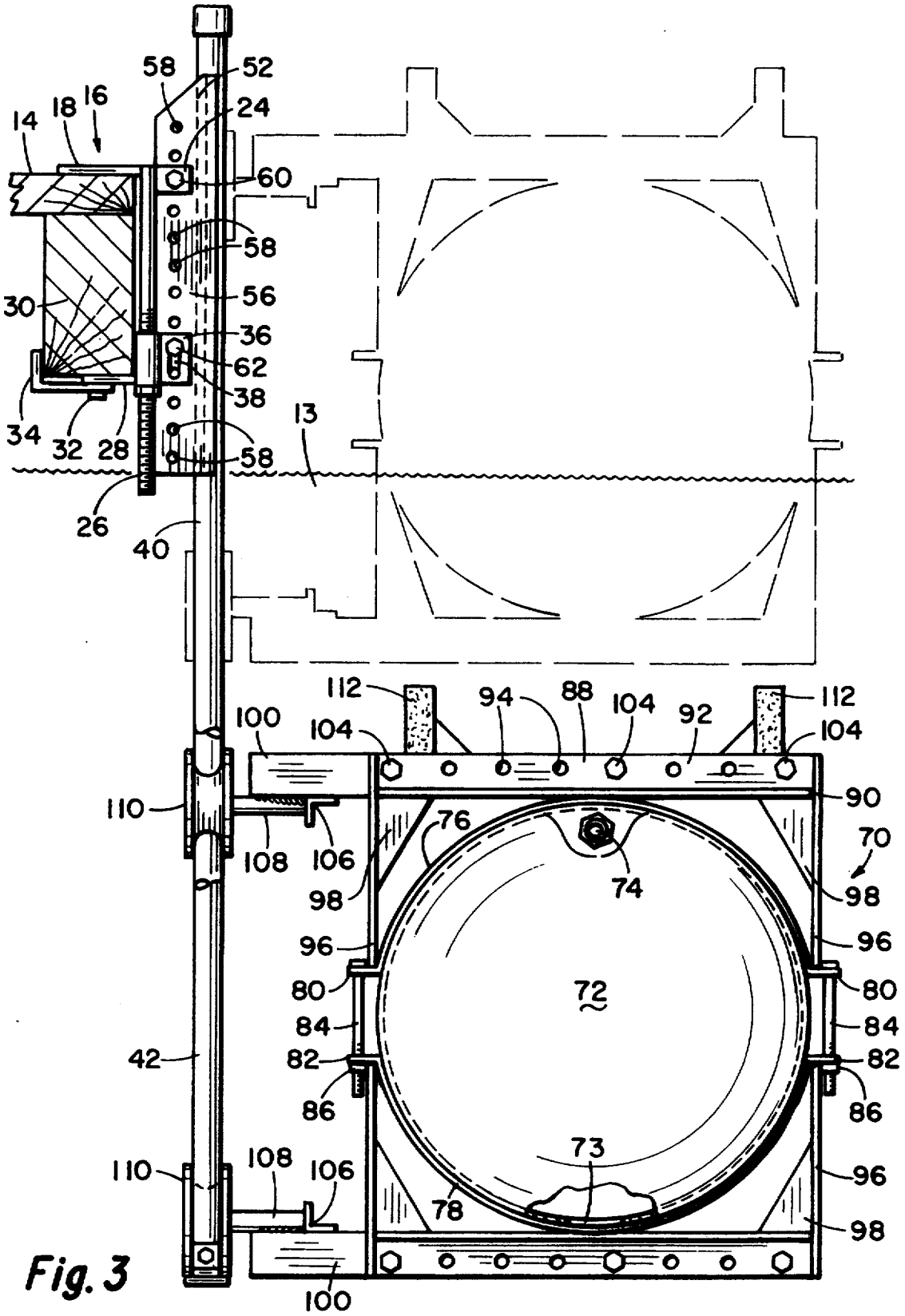
FIG. 3 is a side elevation, with certain parts in section and part of the near vertical pipe broken away, of the present invention, with the upper position thereof shown in dashed lines.

Referring to the drawings in detail, FIG. 1 shows a lift 10 with a water vehicle or boat 12 supported thereon, the lift being in its upper position so that the boat 12 is out of the water 13 (see FIG. 3).

Figure 4:
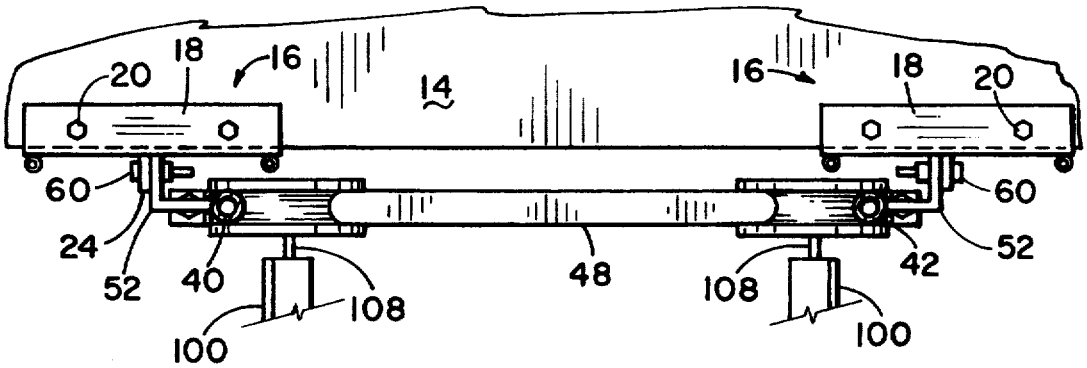
FIG. 4 is a fragmentary plan view, with certain parts in section, of the roller assembly of the present invention as it would appear looking along line 4—4 of FIG. 5.
Figure 5:
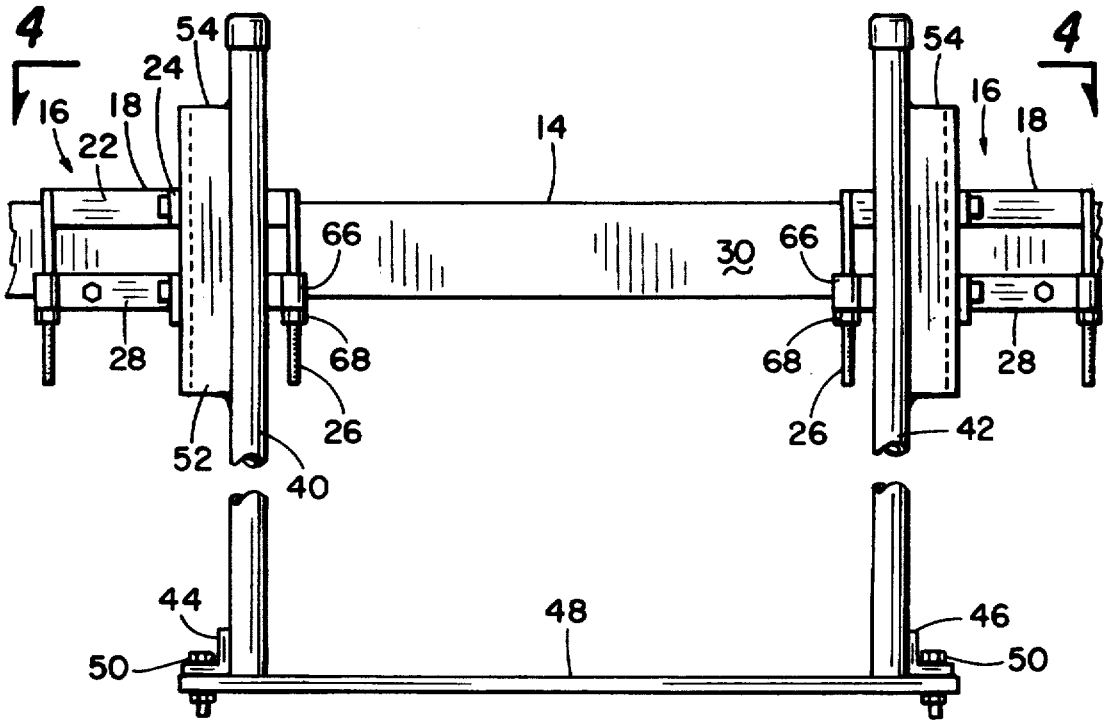
FIG. 5 is a front elevation, with certain parts broken away, of the vertical pipe assembly without the rollers and travelling assembly.

Referring now to FIGS. 3, 4 and 5, the lift 10 is attached to a dock 14 by means of a pair of spaced bracket assemblies 16. These bracket assemblies might vary as to their particulars, depending upon the peculiarities of a given dock; for the purposes of illustration in this case, each dock bracket assembly 16 includes a relatively narrow angle member 18 whose elongated horizontal leg can be bolted or screwed into the dock by means of screws 20. The elongated horizontally extending vertical leg 22 of the angle member 18 lies against the upper edge of the dock. A horizontally extending tab 24 projects out at right angles to the center of the member 22. A pair of elongated vertical bolts or rods 26, threaded along their lower portions, are welded to the side of the member 22 and extend downwardly therefrom.

A second relatively narrow angle member 28 is disposed in parallel relation below the angle member 18; the horizontal leg portion of the member 28 is adapted to underlie the beam 30 which is part of the dock structure 14. The horizontal leg portion of the angle member 28 can be bolted directly to the beam 30 by means of the bolts 32; however, to form a tighter fit, another angle member 34 is adapted to overlie the inner edge of the member 28 between this member and the head of the bolt. The rear vertical leg of the angle member 34 abuts against the rear vertical side of the beam 30. The bolt 32 passes through a slotted opening (not shown) in the horizontal leg of the angle member 34 so that the member 34 can be adjusted forwardly before tightening the bolt 32. A horizontally extending tab 36 projects out at right angles to the center of the vertical leg of the angle member 26 in alignment with the tab 24. However, the tab 36 is provided with a vertical slot 38 for a purpose which will hereinafter appear.

A pair of vertical pipes 40 and 42 (constituting vertical tracks as will hereinafter appear) extend from a location above the dock 14 downwardly to a location adjacent the lake bottom (not shown). A pair of angle brackets 44 and 46 are secured to the lower ends of the pipes 40 and 42. A cross member 48 extends across the bottoms of the pipes 40 and 42 and is bolted at its ends to the brackets 44 and 46 by means of bolts 50. In order to attach the upper portions of the pipes to the dock, a pair of vertically extending angle members 52 are welded to the sides of the pipes 40 and 42. Each angle member 52 has a vertical leg 54 which is essentially parallel to the side of the dock. The vertical inboard edges of the legs 54 are welded to the sides of the pipes 40 and 42 as shown in FIG. 5.

Each angle member 52 has a vertical leg 56 which is essentially at right angles to the side of the dock (see FIG. 3). Each vertical leg 56 is provided with a plurality of vertically and evenly spaced holes 58 which permit vertical adjustment of the pipes 40 and 42. One of the holes 58 (the third one down in FIG. 3) in each leg 56 is aligned with a hole (not shown) in each tab 24 and a bolt 60 passes through these aligned holes to secure the angle members 52, and hence, the pipes 40 and 42 to the brackets assemblies 16. A lower of the holes 58 of each of the legs 56 is in alignment with each of the slots 38 in the tabs 36 and a bolt 62 passes through each slot 38 and aligned hole 58.

A pair of sleeves 66 are welded to the ends of the member 38 such that the rods 26 pass through these sleeves. Nuts 68 are threadedly received on the lower ends of each of the rods 26 such that tightening of these nuts will urge each angle member 28 upwardly toward each angle member 18, thereby anchoring each bracket assembly 16 firmly on the dock. The above explanation describes a specific manner in which the bracket assemblies are secured to the dock structure and a specific manner in which the upper ends of the pipes 40 and 42 are secured to the bracket assemblies. It should be understood that the bracket assemblies could be attached to the dock structure in other and equivalent ways, and that the upper ends of the pipes 40 and 42 could be attached to the bracket assemblies in other equivalent ways.

Figure 2:
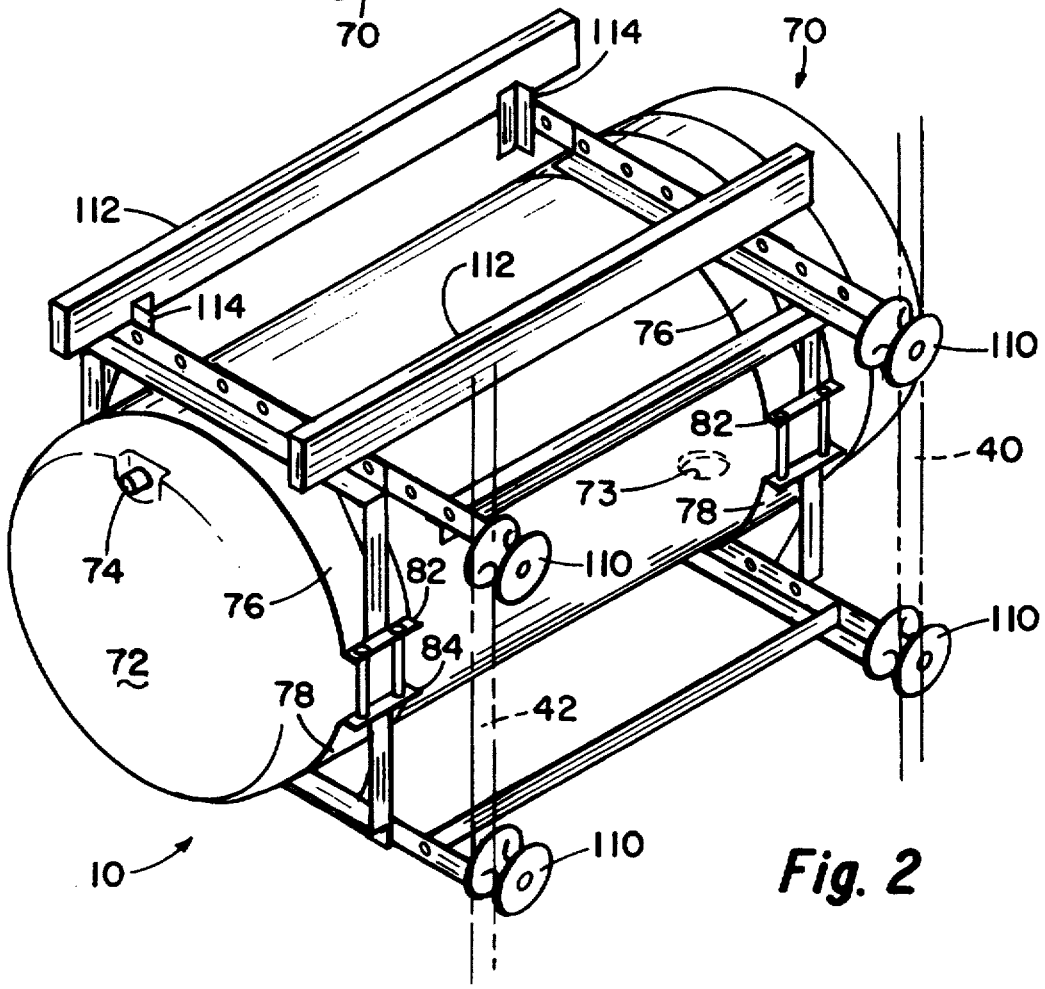
FIG. 2 is a perspective view of the travelling assembly only as viewed from the dock side.

FIGS. 2 and 3 show details of a tank or float assembly 70 which includes a horizontal cylindrical tank 72 having an opening (not shown) adjacent an upper end thereof and from which a horizontal nipple 74 extends. A suitable air pump (not shown) connects with the nipple 74 through a suitable hose 75 and a suitable valve (not shown) to supply air into the interior of the tank. When air is introduced into the tank 72 in the manner briefly described above, the water will be displaced outwardly from the tank through a larger opening 73 at the bottom of the tank 72.

A pair of upper curved bands 76 made of flexible metal straps surround the upper portion of the tank adjacent the ends thereof. A similar pair of curved bands 78 surround the lower portion of the tank 72 in alignment with the upper bands 76. The ends of the upper bands are bent outwardly away from the tank 72 to form short horizontal flanges 80; likewise, the ends of the lower bands 78 are similarly bent to form short horizontal flanges 82 which are spaced below the flanges 80. The upper bands 76 are pulled toward the lower bands by means of bolts 84 and nuts 86. There are two bolts 84 which pass downwardly through suitable holes (not shown) in each flange 80 and through and below suitable holes (not shown) in the flanges 82; the nuts 86 are screwed onto the lower threaded ends of the bolts 84 and tightened so that the bands firmly engage the outer circumference of the tank 72.

An upper frame structure is positioned above each above band 78; each upper frame structure comprises a horizontal angle member 88 whose horizontal leg 90 lies over the band 76 and whose vertical leg 92 is provided which a horizontal row of spaced holes 94. The upper frame structure also includes a pair of thin flat vertical plates 96 which connect at their upper ends to the side ends of the angle member 88 and which connect at their lower ends to the flanges 80. A pair of gussets 98 connect across the inner angle between each member 88 and plate 96 to provide additional strength and rigidity.

A lower frame structure is provided which is the mirror image of the upper frame structure just described above, and the members bear the same reference numerals for the corresponding parts; that is, the lower frame structure also has a horizontal angle member 88 whose horizontal leg 90 lies under the band 78 and whose vertical leg 92 is provided which a horizontal row of spaced holes 94. The lower frame structure also includes a pair of thin flat vertical plates 96 which connect at their upper ends to the side ends of the angle member 88 and which connect at their lower ends to the flanges 80. A pair of gussets 98 connect across the inner angle between each member 88 and plate 96 to provide additional strength and rigidity.

A roller arm assembly is provided for each of four rollers, as will hereinafter appear. Each roller assembly includes an elongated brace angle 100 whose vertical leg is provided with a plurality of holes (not shown) which are designed to mate with the holes 94 in the angle member 88. A plurality of bolts 104 pass through the holes 94 and through the holes in the angle brace 100 to secure each roller arm assembly to the float or tank assembly. The arrangement of the holes in the brace angle 100, the holes 94 in the angle member 88 and the bolts 104 is such that the repositioning of the bolts in different aligned pairs of holes permits the relative movement of the brace angle 100 outwardly or inwardly with respect to the tank assembly.

A horizontal cross-member 106, extends across each upper pair and each lower pair of angle members 100 spaced from the distal ends of the members 100. A roller shaft 108 is welded to the horizontal leg of each member 100 so as to project outwardly therefrom as shown in FIG. 3. A roller 110 is rotatably mounted on the outer end of each roller shaft 108. These rollers 110 are positioned to ride or roll against the inboard sides of the pipes 40 and 42.

For the purpose of supporting a water vehicle or craft on the float apparatus of the present invention, a pair of spaced blocks 112 extend across the tops of the upper members 88 substantially parallel to the dock. These blocks can be made of wood, if desired, and are preferably covered with cloth or carpet-like material to prevent maring or scratching of the boat hull when a water vehicle is brought to rest on these blocks. The blocks can be connected to the members 88 in any convenient manner, for example by means of the brackets 114 shown in FIG. 2.

Assuming that the float or tank assembly 70 is in its lowermost position as shown in FIG. 1, or in the solid line position shown in FIG. 3, a water craft can be positioned on or over the submerged blocks 112. The air pump (not shown) can be turned on and air will be introduced into the tank 72 while water is forced out of the opening at the bottom of the tank. The tank will commence to rise while the rollers 110 roll against the sides of the pipes 40 and 42. Continued pumping of air into the tank 72 will cause the water vehicle to be lifted bodily out of the water. When the tank assembly reaches the desired vertical position, the valve (not shown) is closed to prevent air from escaping from the tank 72 and the air pump is turned off simultaneously. When it is desired to lower the tank assembly, the valve (not shown) is opened to allow air to pass out of the hose 75 while water passes into the tank through the bottom hole 73, thereby causing the tank assembly to lower into and beneath the water.

Whereas the present invention has been disclosed in terms of the specific structure described above, it should be understood that other and further modifications, apart from those shown or suggested herein, may be made within the spirit and scope of this invention.

What is claimed is:

1. A line for water vehicles comprising a pair of vertical pipes attached adjacent their upper ends to one side only of a dock structure which is positioned alongside a body of water, a tank assembly having a roller assembly thereon for engaging the sides of the pipes for rolling upwardly and downwardly thereon, the tank assembly having a tank mounted thereon and an upper opening for introducing air into the tank to displace water therefrom through a lower opening at the bottom of the tank so as to cause the tank to rise, the tank assembly having a pair of spaced padded blocks for supporting a water vehicle thereon, the roller assembly having rollers thereon adapted to ride along the inboard sides of the pipes when the tank assembly moves vertically in response to the introduction of air to and removal of air from the tank, whereby, when a water vehicle is supported on the padded blocks and the tank assembly is in lowermost position, air can be introduced into the tank through the upper opening while water is forced outwardly from the lower opening so that the vehicle can be elevated above the body of water.

2. A lift for water vehicles as set forth in claim 1 wherein the pipes are attached to the dock structure by means of a pair of spaced bracket assemblies.

3. A lift for water vehicles as set forth in claim 2 wherein the bracket assemblies are attached to an upper side edge of the dock structure and are also attached to the pipes in such a manner as to permit vertical adjustment of the pipes.

4. A lift for water vehicles as set forth in claim 1 wherein the tank assembly is provided with a frame structure which includes a pair of upper curved bands made of flexible metal straps surrounding an upper portion of the tank adjacent the ends thereof, a pair of lower curved bands surrounding a lower portion of the tank in alignment with the upper bands, the ends of the upper bands being bent outwardly away from the tank to form short horizontal flanges, the ends of the lower bands being similarly bent to form short horizontal flanges which are spaced below the upper flanges, the upper bands being pulled toward the lower bands by means of bolts which pass through the upper and lower flanges and by nuts which are received on the lower ends of the bolts, the nuts being tightened so that the bands will firmly engage the outer circumference of the tank.

5. A lift for water vehicles as set forth in claim 4 wherein the roller assembly is attached to the frame structure.

*6. A lift for water vehicles comprising:*

*means attached to one side only of a dock structure for guiding the direction of movement of the lift upwardly and downwardly in relation to said structure;*

*a tank having upper and lower openings, said upper opening for introducing air into said tank to displace water therefrom through said lower opening so as to cause said tank to rise;*

*means mounted on said tank for supporting a water vehicle thereon; and*

*at least one pair of rollers fixed to said tank and engaged with and adapted for riding along said guiding means for rolling upwardly and downwardly thereon when said tank moves in response to the introduction of air into and the releasing of air from said tank, respectively.*

*7. A lift according to claim 6 having two said pairs of rollers spaced vertically apart on said tank.*

*8. A lift according to claim 6, said guiding means comprising a pair of parallel members.*

*9. A lift according to claim 8, said pair of members comprising a pair of pipes.*

*10. A lift according to claim 9, said pipes being vertical.*

*11. A lift according to claim 10, said pipes being attached to said dock structure proximate their upper ends.*

*12. A lift according to claim 11, said rollers tracking along inboard portions of said pipes.*

* * * * *